US008724218B2

(12) United States Patent
Curtis et al.

(10) Patent No.: US 8,724,218 B2
(45) Date of Patent: May 13, 2014

(54) SPECKLE REDUCTION USING SCREEN VIBRATION TECHNIQUES AND APPARATUS

(75) Inventors: Kevin Curtis, Longmont, CO (US); David A. Coleman, Louisville, CO (US); Gary D. Sharp, Boulder, CO (US)

(73) Assignee: RealD Inc., Beverly Hills, CA (US)

( * ) Notice: Subject to any disclaimer, the term of this patent is extended or adjusted under 35 U.S.C. 154(b) by 0 days.

(21) Appl. No.: 13/544,962

(22) Filed: Jul. 9, 2012

(65) Prior Publication Data
US 2013/0010356 A1 Jan. 10, 2013

Related U.S. Application Data

(60) Provisional application No. 61/505,212, filed on Jul. 7, 2011.

(51) Int. Cl.
*G03B 21/56* (2006.01)
(52) U.S. Cl.
USPC .......................................................... 359/446
(58) Field of Classification Search
USPC .................................................. 359/444–446
See application file for complete search history.

(56) References Cited

U.S. PATENT DOCUMENTS

| | | | | |
|---|---|---|---|---|
| 1,710,922 | A | * | 4/1929 | De Forest ............... 359/444 |
| 1,817,630 | A | * | 8/1931 | Kroesen ................ 359/444 |
| 3,125,927 | A | * | 3/1964 | Erban ..................... 359/446 |
| 4,035,068 | A | | 7/1977 | Rawson |
| 4,155,630 | A | | 5/1979 | Ih |
| 4,360,372 | A | | 11/1982 | Maciejko |
| 5,272,473 | A | | 12/1993 | Thompson |
| 5,313,479 | A | | 5/1994 | Florence |
| 6,122,023 | A | | 9/2000 | Chen |
| 6,594,090 | B2 | | 7/2003 | Kruschwitz et al. |
| 6,844,970 | B2 | | 1/2005 | Olczak |
| 6,895,149 | B1 | | 5/2005 | Jacob et al. |
| 7,199,933 | B2 | | 4/2007 | Yavid |
| 7,244,028 | B2 | | 7/2007 | Govorkov |
| 7,342,719 | B1 | | 3/2008 | Kalmanash |
| 7,379,651 | B2 | | 5/2008 | Abu-Ageel |
| 7,489,714 | B2 | | 2/2009 | Park et al. |
| 7,527,384 | B2 | | 5/2009 | Kim et al. |
| 7,585,078 | B2 | | 9/2009 | Kim |
| 7,593,159 | B2 | * | 9/2009 | Yokoyama et al. ........... 359/446 |
| 7,719,738 | B2 | | 5/2010 | Abu-Ageel |

(Continued)

OTHER PUBLICATIONS

Gollier, Jacque, "Speckle Measurement Procedure," Conference Projector Summit 2010, Las Vegas NV, May 7, 2010.

(Continued)

*Primary Examiner* — Christopher Mahoney
(74) *Attorney, Agent, or Firm* — Neil G. J. Mothew; Darlene K. Kondo

(57) ABSTRACT

Disclosed herein are systems and related methods for reducing speckle on display screen. More specifically, screen vibration is used to reduce speckle, and in accordance with the disclosed principles, the vibration may be achieved by using wave-based actuation (e.g., acoustic or electromagnetic waves) to vibrate the screen. In an exemplary embodiment, a speckle reducing system may comprise at least one actuating element located proximate to, but not in physical contact with, a display screen. In addition, the at least one actuating element may be configured to generate waves directed towards the display screen. When the waves impact the display screen, the waves impart vibration to the display screen.

8 Claims, 3 Drawing Sheets

(56) References Cited

U.S. PATENT DOCUMENTS

| | | |
|---|---|---|
| 7,740,359 B2 * | 6/2010 | Schnuckle et al. ............ 353/79 |
| 7,777,947 B2 * | 8/2010 | Congard et al. ............ 359/445 |
| 7,898,734 B2 | 3/2011 | Coleman |
| 7,922,333 B2 | 4/2011 | Akahane |
| 2005/0008290 A1 | 1/2005 | Miron |
| 2009/0168025 A1 | 7/2009 | Domm |
| 2009/0297797 A1 | 12/2009 | Coleman |
| 2010/0053476 A1 | 3/2010 | Maxson |
| 2010/0079848 A1 | 4/2010 | Grasser et al. |
| 2010/0118397 A1 | 5/2010 | Powell |
| 2010/0296064 A1 | 11/2010 | Silverstein et al. |
| 2010/0296065 A1 | 11/2010 | Silverstein et al. |
| 2011/0102748 A1 | 5/2011 | Shevlin |
| 2011/0149389 A1 | 6/2011 | Sharp |
| 2011/0149390 A1 | 6/2011 | Petersen |

OTHER PUBLICATIONS

Goodman, Joseph, "Speckle Phenomena in Optics" Ch. 7 (Roberts and Company 2006).

Balanis, Constantine A. "Modern Antenna Handbook" (Wiley 2008).

* cited by examiner

SPECKLE REDUCTION USING SCREEN VIBRATION TECHNIQUES AND APPARATUS

PRIORITY CLAIM

This disclosure is a nonprovisional conversion of, and thus claims priority to, U.S. Provisional Patent Application No. 61/505,212, filed Jul. 7, 2011, and entitled "Speckle reduction using screen vibration techniques and apparatus," which is hereby incorporated by reference in its entirety.

TECHNICAL FIELD

Generally, this disclosure generally relates to cinematic screens, and more particularly relates to reduction of speckle in cinematic screens.

BACKGROUND

The use of coherent or partially coherent sources can have advantages in display or illumination over standard incoherent sources (lamps) in that they can achieve higher brightness, better reliability, and larger color gamut. However, with this partial coherence comes the issue of speckle. Speckle is due to interference of the light on the screen or target that causes variations in intensity that can be seen by the observer or an instrument. These typically high frequency intensity variations are very undesirable for display or imaging applications.

BRIEF SUMMARY

Screen vibration may be used to reduce speckle in display applications. The vibration may be achieved by using actuation (e.g., acoustic or electromagnetic waves) to vibrate the screen. This is particularly relevant for large theater screens (>20 feet) but can also be used for home or business screens, possibly in conjunction with other speckle reduction methods.

In one aspect, disclosed herein are systems for reducing such speckle on a display screen. In an exemplary embodiment, such a system may comprise at least one actuating element located proximate to, but not in physical contact with, a display screen. In addition, in such embodiments, the at least one actuating element is configured to generate waves directed towards the display screen. When the waves impact the display screen, the waves impart vibration to the display screen.

In another aspect, methods of reducing speckle on a display screen are disclosed herein. In one exemplary embodiment, such a method may comprise positioning at least one actuating element proximate to, but not in physical contact with, a display screen. In addition, such exemplary methods may also include generating waves with the at least one actuating element, and directing the generated waves towards the display screen. When the waves impact the display screen, the waves impart vibration to the display screen.

BRIEF DESCRIPTION OF THE DRAWINGS

Embodiments are illustrated by way of example in the accompanying figures, in which like reference numbers indicate similar parts, and in which.

DETAILED DESCRIPTION

Figure 1:
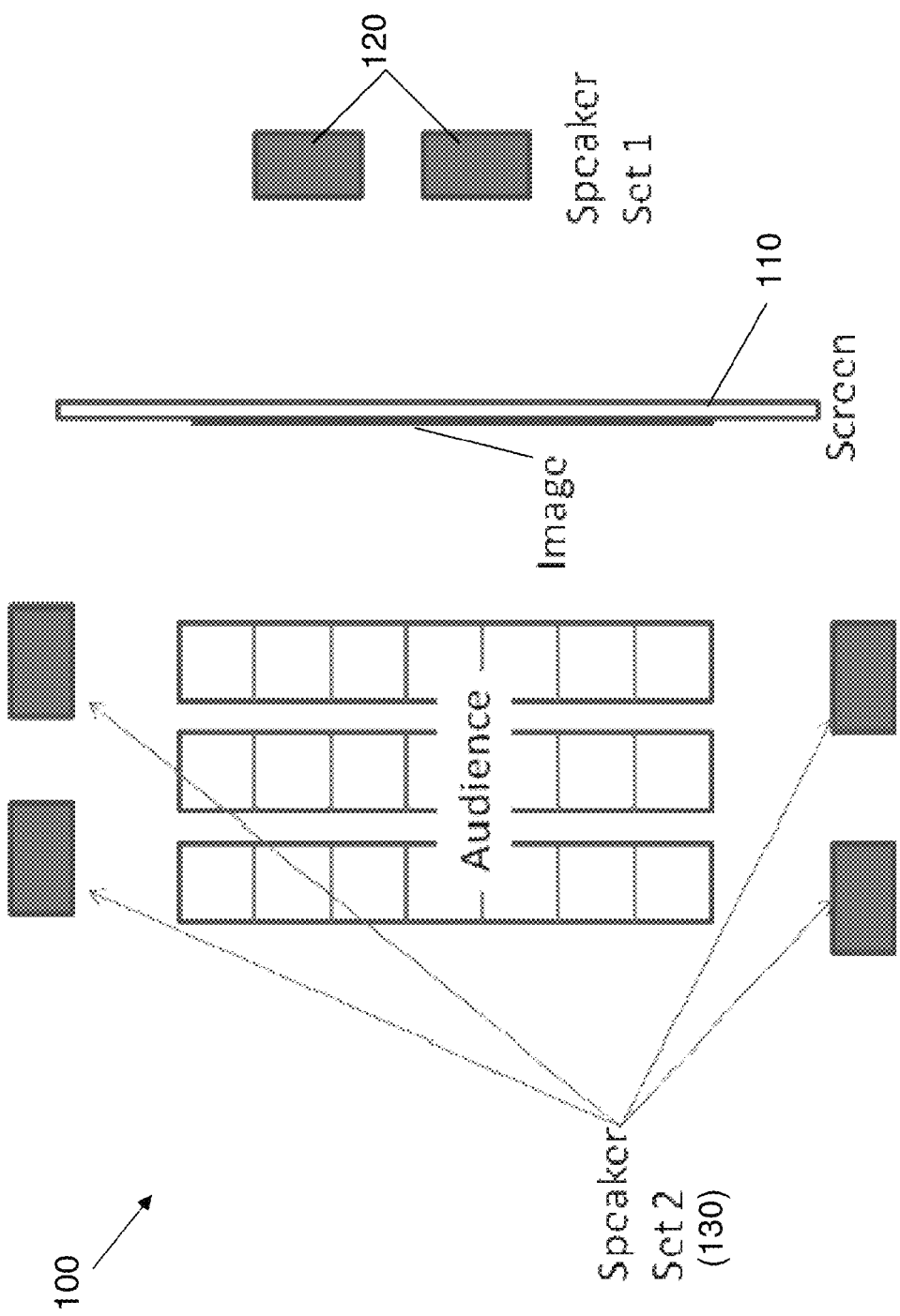
FIG. 1 is a schematic diagram showing a top down view of a configuration for a theater that uses acoustic waves to actuate the screen, in accordance with the present disclosure.

There are various known techniques for addressing these high frequency intensity variations. How to measure and characterize speckle is also well known. Speckle is measured by measuring the contrast of the light intensity. This is defined as the standard deviation over the mean of the intensity. For how to measure speckle, See Jacques Gollier, *Speckle Measurement Procedure*, Conference Projector Summit 2010, Las Vegas Nev., May 7, 2010, herein incorporated by reference.

Some currently known techniques to reduce speckle include a first family of techniques to reduce speckle that involves using moving diffusers (one or many) to achieve changes to the phase locally to temporally average out some of the speckle over the observer's/detector's integration period. See, e.g., U.S. Pat. No. 5,313,479, entitled "Speckle-free display system using coherent light," U.S. Pat. No. 4,035,068, "Speckle minimization in projection displays by reduced spatial coherence of the image light", and U.S. Pat. No. 7,585,078, "Illumination system capable of eliminating laser speckle and projection system employing the same," all of which are herein incorporated by reference. The diffusers can also be vibrating with an amplitude that is large enough to cover several diffractive elements to achieve some averaging as well. See U.S. Pat. No. 7,922,333, entitled "Projector, screen, projector system, and scintillation removing apparatus for removing scintillation on an image," herein incorporated by reference.

A second family of techniques to reduce speckle involves using moving mirrors or phase modulators to achieve the temporal averaging. See, e.g., U.S. Published Patent Application No. 2011/0102748, entitled "Optical system and method," and U.S. Published Patent Application No. 2010/0053476, entitled "Systems and methods for despeckling a laser light source," U.S. Pat. No. 4,155,630, entitled "Speckle elimination by random spatial phase modulation," and U.S. Pat. No. 7,489,714, entitled "Speckle reduction laser and laser display apparatus having the same," all herein incorporated by reference in their entireties. Generally, a disadvantage of this family of techniques includes the use of expensive moving parts or phase modulators.

A third family of techniques to reduce speckle involves using a large core, long, very high numerical aperture (NA) multimode fiber to "decoher" a laser beam. See, e.g., U.S. Published Patent Application No. 2009/0168025, entitled "Decohered laser light production system," (herein incorporated by reference), which discusses the use of a 12 mm diameter core fiber with an NA of 0.65. This large fiber may provide some reduction in speckle but deleteriously destroys the brightness of the system since the etendue is so very large. Similarly, using a very long multimode fiber can have some benefits. For instance, see U.S. Published Patent Application No. 2010/0079848, "Speckle reduction in display systems that employ coherent light sources" but reduces the power with absorption. However, multimode fiber speckle issues and solutions seems to be well known in the field. See, e.g., Joseph Goodman, *Speckle Phenomena in Optics*, Ch. 7 (Roberts and Company 2006). All references cited in this paragraph are herein incorporated by reference.

A fourth family of techniques has been proposed that involve dividing the beam up into parts, and then forcing each part to have different path lengths or changes of polarization before recombining the beams. Examples using fiber bundles or splitter/combiners or lenslet arrays include: U.S. Published Patent Application No. 2005/0008290 "Static method for laser speckle reduction and apparatus for reducing speckle;" U.S. Pat. No. 4,360,372, "Fiber optic element for reducing speckle noise;" U.S. Pat. No. 6,895,149, entitled "Apparatus for beam homogenization and speckle reduction;" U.S. Pat. No. 7,379,651, entitled "Method and apparatus for reducing laser speckle;" U.S. Pat. No. 7,527,384, entitled "Illumination system to eliminate laser speckle and projection system employing the same;" U.S. Pat. No. 7,719,738, entitled "Method and apparatus for reducing laser speckle." U.S. Pat. No. 6,594,090, entitled "Laser projection display system," which uses a lenslet integrator in conjunction with a moving diffuser to reduce speckle, states that the integrator makes the diffuser more effective. Some published applications disclose the use of a moving lenslet array instead of a diffuser to reduce speckle. See, e.g., U.S. Published Patent Application No. 2010/0296065, entitled "Out-of-plane motion of speckle reduction element," and U.S. Published Patent Application No. 2010/0296064, entitled "Projection with lenslet arrangement on speck reduction element." These teachings use expensive fiber bundles or lens arrays or many fiber coupler/splitters to achieve some reduction in speckle. All references cited in this paragraph are herein incorporated by reference.

Another family of solutions exist utilizing sources with larger spectral bandwidths. This can be achieved by chirping the drive current, using several lasers of different wavelengths or other means.

Moving the screen is also a potential solution to the undesirable problem of speckle. In chapter six of the book "Speckle Phenomena in Optics", supra, the linear shift rate of the screen in x or y or screen rotation (these motions are the plane of the screen which is roughly normal to the projection) is calculated in order to average out some of the speckle during the observer's/detector's time integration period. By moving it, the light hits different parts of the screen which then changes the speckle pattern. If this is done fast relative to the detector's integration period (for example, the eye is roughly 20 Hz) then the detector will see an average of several speckle patterns, which results in a lower speckle contrast. In U.S. Pat. No. 5,272,473, entitled "Reduced-speckle display system," the use of a transducer attached directly to the screen to mechanically generate surface acoustic waves to minimize speckle is taught. U.S. Pat. No. 6,122,023, entitled "Non-speckle liquid crystal projection display" teaches the use of a highly scattering liquid crystal as a screen, and then electrically changing the liquid crystal states to alleviate speckle. Other teachings have used scattering liquids or diffuser cells as screens to improve speckle. See, e.g., U.S. Pat. No. 6,844,970, entitled "Projection television set, screens, and method;" U.S. Pat. No. 7,199,933, "Image projection screen with reduced speckle noise;" U.S. Pat. No. 7,244,028, "Laser illuminated projection displays", U.S. Pat. No. 7,342,719, "Projection screen with reduced speckle," and U.S. Published Patent Application No. 2010/0118397, "Reduced laser speckle projection screen." All references cited in this paragraph are herein incorporated by reference.

The present disclosure teaches the use of screen vibration to reduce speckle in display applications. The vibration may be achieved by using wave-based actuation (e.g., acoustic or electromagnetic waves) to vibrate the screen. This is particularly relevant for large theater screens (>20 feet) but can also be used for home or business screens, possibly in conjunction with other speckle reduction methods. The advantages of the disclosed techniques include vibration of the screen using existing resources or inexpensive additional actuating elements (e.g., speakers) to reduce speckle. In addition, such a vibration technique does not use mechanical transducers that can wear out or mechanical attachments to the screen which can fail as well. In addition, it should be possible to achieve a more uniform vibration of the screen using the disclosed techniques.

To effectively average out speckle, the velocity of the screen should be larger than one half of an optical wavelength of light divided by the integration time of the eye (typically 10-50 ms). This can be achieved by using frequencies or frequency induced in the screens that are above 20 Hz. The desired vibration amplitude of the screen is ideally about one half of an optical wavelength but can be as small as 50 nm and still achieve some useful effect. Since the motion is what matters, screens can be vibrated at lower frequencies such as 5-25 Hz and still achieve speckle reduction with larger amplitudes of screen motion. This low frequency excitation causing speckle reduction has been experimentally verified. Additionally, newer screen materials can be used very effectively with this technique.

FIG. 1 is a schematic diagram showing a typical configuration for a theater 100 which has speakers 120 behind the screen 110 (Speaker set 1) and speakers 130 in front of the screen 110 (e.g., on sides and even the back wall of the theater) as represented by speaker set 2. The speaker(s) 120 behind the screen 110 can be used to vibrate the screen 110, in accordance with the disclosed principles. Most theater screens absorb (or reflect) almost all energy above 15 kHz. However, it is possible to use an acoustic frequency nearly above or below what can be heard by humans to shake the screen 110. Humans typically hear about 35-16,000 Hz, with younger children typically being able to hear maybe up to 18,000 Hz or even 20,000 Hz. The tone or multiple tones can be produced by the standard audio speaker(s) and added to the speaker's amplifier, or separate speaker(s) and amplifiers could be used specifically for this purpose. The screen will also have a resonance frequency or frequencies, and by exciting the screen at these frequencies, or multiple or sub-harmonics of these frequencies, better vibration can be achieved. Preferred ranges of excitation frequencies lay in the range 10-100 Hz. Alternatively the speakers in front of the screen (set 2) can be used to vibrate the screen or a combination of set 1 and set 2 can be used. In an advantageous embodiment, the preferred set of speaker to use may be set 120 which are physically near the screen 110. Exemplary speakers for use with the disclosed principles include those commonly referred to as sub-woofers, which work well in the preferred range of frequencies discussed above. Multiple tones can be used at the same time to excite the screen 110 as well as single tones. Depending on the size of the screen 110 and how far the vibrations effectively travel in the screen 110 before being attenuated, multiple speakers may be used to excite the entire screen 110 or most of the screen 110. The speakers can be spatially arranged across the back of the theater (e.g., in embodiments where the speakers are behind the screen 110) to excite the screen more uniformly.

Figure 2:
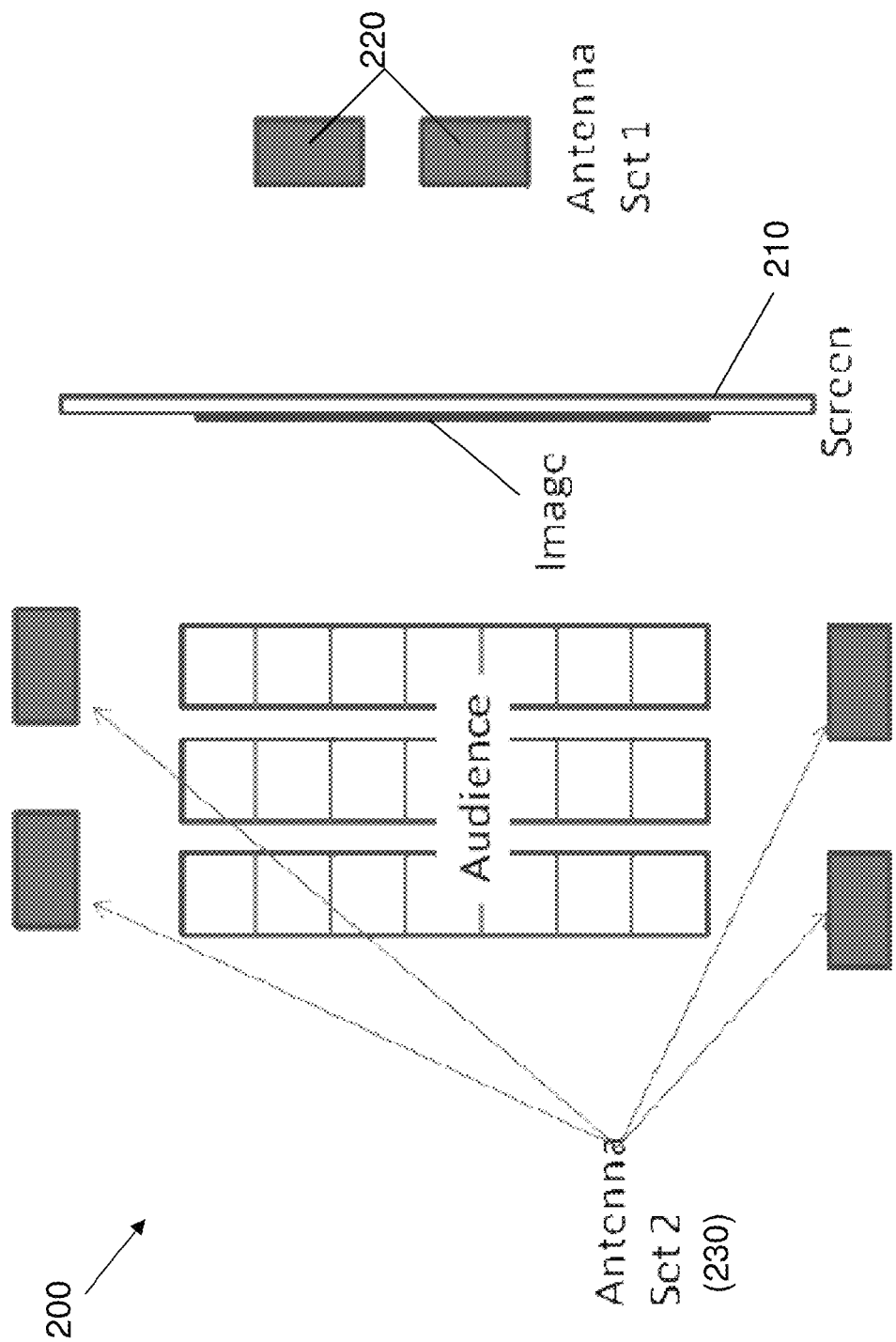
FIG. 2 is a schematic diagram showing a top down view of a configuration for a theater that uses electromagnetic waves to actuate the screen, in accordance with the present disclosure.

FIG. 2 is a schematic diagram showing a top down view of a configuration for a theater 200 that uses electromagnetic waves to actuate a screen 210. Thus, in accordance with this embodiment of the disclosed principles, electromagnetic waves rather than acoustic excitation can be used for screen vibration. In such embodiments, antenna(s) may be used to absorb the excitation and convert it to vibration of the screen. The antennas can be located behind or attached to the back of the screen and thus not show on the front of the screen, such as the antennas 220 of Antenna Set 1 illustrated in FIG. 2. Radiating antennas 230 can also be in front of the screen, such as the antennas 230 of Antenna Set 2 illustrated in FIG. 2. Moreover, radiating antennas may be located both behind and in front of the screen 210, in accordance with the disclosed principles.

Figure 3:
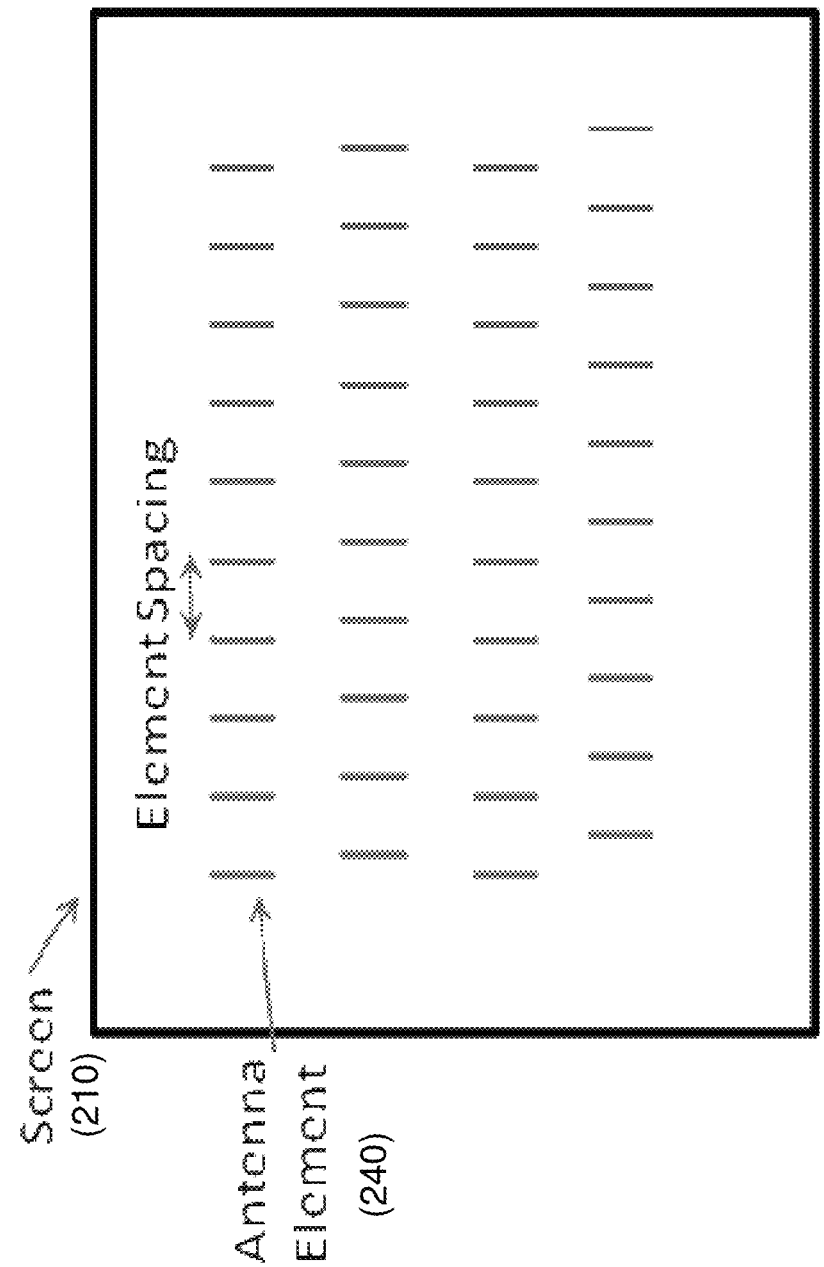
FIG. 3 is a schematic diagram of a screen having antenna elements incorporated therein, in accordance with the present disclosure.

The frequencies that can easily be used range from 10 MHz to approximately 6 GHz. The antennas can be omnidirectional or directional. On the screen 210 itself, arrays of antennas 240 can be used absorb the radiation and convert that to vibration of the entire screen. FIG. 3 shows an example of an array of half wave antenna elements 240 that can be vibrated with the electromagnetic radiation. The antenna elements 240 can be spaced randomly, or at ¼, ½, or whole wavelengths, or multiples of the radiation wavelength. Examples of various types of antennas that may be employed with the disclosed principles include horn, dipole, monopole, loop, waveguide, micro-mechanical, micro-strip, and many other types of antenna used in microwave communications or in microwave ovens. For examples, see the book, *Modern Antenna Handbook*, Constantine A. Balanis (Wiley 2008).

The screen used in accordance with the disclosed principles can be adapted from a conventional movie screen or a polarization preserving screen for showing three-dimensional content. An exemplary polarization preserving screen is shown in commonly-owned U.S. Pat. No. 7,898,734, entitled "Polarization preserving front projection screen," herein incorporated by reference. Conventional transmission projection screens typically include a polymer substrate (usually poly-vinyl-chloride (PVC)) roll stock that is perforated for acoustic transmission and then seamed together to the desired screen size. These screens are typically 0.2-0.6 mm thick, heavily plasticized, and embossed with a matte texture.

To produce a polarization preserving screen, the same screen may then be sprayed with a polarization preserving coating. The conventional coating may include a type of metal flake (for example, ball-milled aluminum powder) encased in a polymer binder. Significant optical performance improvements can be realized by utilizing a metalized embossed surface, as described in U.S. Published Patent Application No. 2009/0297797. Moreover, in accordance with the disclosed principles, such metal flakes or similar elements coated on the screen may be employed to absorb electromagnetic waves, rather than attaching antenna elements to the screen as described above, and thereby provide the vibration of the screen.

For proper fidelity, a more rigid substrate, such as polyester or polycarbonate, could be used for the screen. A hybrid approach may use the embossed surface to texture metal flake as described in commonly-owned U.S. patent application Ser. No. 12/977,026, entitled "Polarization preserving projection screen with engineered pigment and method for making same," or to physically chop the metalized substrate as described in commonly-owned U.S. patent application Ser. No. 12/976,986, entitled "Polarization preserving projection screen with engineered particle and method for making same" (both herein incorporated by reference), either of which could then be utilized to replace the metal flake in a conventional screen system. This could be applied on either a conventional (PVC) or more rigid substrate. Rear-projection polarization preserving screens typically include a diffusely scattering transparent polymer substrate, an embossed transparent substrate, or a combination of the two. These more rigid screen materials may be employed in preferred embodiments, as they transmit vibrations more effectively over a large area. This means that fewer speakers or other movement source(s) may be used to vibrate the entire screen.

In addition, vibration of the screen has been experimentally shown to reduce speckle for standard projection lamps, so the principles disclosed herein may also be applied with lamp based projection. Particularly, some of the polarization preserving screens exhibit noticeable speckle with standard lamp based projection. Additionally, the principles disclosed herein may be utilized for both rear and front projection displays. It is also useful for both 2D (two dimensional) and 3D (three dimensional) displays.

As may be used herein, the terms "substantially" and "approximately" provide an industry-accepted tolerance for its corresponding term and/or relativity between items. Such an industry-accepted tolerance ranges from less than one percent to ten percent and corresponds to, but is not limited to, component values, angles, et cetera. Such relativity between items ranges between less than one percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

What is claimed is:

1. A speckle reducing system for reducing speckle on a display screen, the system comprising:
    at least one actuating element located proximate to, but not in physical contact with, a display screen;
    wherein the at least one actuating element is configured to generate waves directed towards the display screen, the waves impacting the display screen to impart vibration to the display screen, further wherein the waves generated by the at least one actuating element are generated in pulses.

2. A method of reducing speckle on a display screen, the method comprising:

positioning at least one actuating element proximate to, but not in physical contact with, a display screen;
generating waves with the at least one actuating element; and
directing the generated waves towards the display screen, the waves impacting the display screen to impart vibration to the display screen, wherein generating the waves comprises generated pulses of waves.

3. A speckle reducing system for reducing speckle on a display screen, the system comprising:
at least one actuating element located proximate to, but not in physical contact with, a display screen;
wherein the at least one actuating element is configured to generate waves directed towards the display screen, the waves impacting the display screen to impart vibration to the display screen, further wherein the at least actuating element comprises at least one electromagnetic wave generator, and the waves generated are electromagnetic waves.

4. A speckle reducing system according to claim 3, further comprising a plurality of radiating antennas located on a surface of the display screen, each of the plurality of radiating antennas configured to receive electromagnetic waves thereby imparting the vibration to the display screen.

5. A speckle reducing system according to claim 4, wherein the plurality of radiating antennas are located on a back surface of the screen, on a front surface of the screen, or a combination thereof.

6. A method of reducing speckle on a display screen, the method comprising:
positioning at least one actuating element proximate to, but not in physical contact with, a display screen;
generating waves with the at least one actuating element; and
directing the generated waves towards the display screen, the waves impacting the display screen to impart vibration to the display screen, wherein the at least actuating element comprises at least one electromagnetic wave generator, and generating waves comprises generating electromagnetic waves.

7. A method according to claim 6, further comprising positioning a plurality of radiating antennas on a surface of the display screen, each of the plurality of radiating antennas configured to receive electromagnetic waves thereby imparting the vibration to the display screen.

8. A method according to claim 7, further comprising positioning the plurality of radiating antennas on a back surface of the screen, on a front surface of the screen, or a combination thereof.

* * * * *